United States Patent [19]

Zeiger

[11] Patent Number: 5,441,400
[45] Date of Patent: Aug. 15, 1995

[54] SPRING BIASED CHECK VALVE FOR AN INJECTION MOLDING MACHINE

[76] Inventor: Donald J. Zeiger, 26 Cheyenne Trail, Malvern, Ohio 44644

[21] Appl. No.: 224,334

[22] Filed: Apr. 7, 1994

[51] Int. Cl.⁶ .............................................. B29C 45/23
[52] U.S. Cl. ..................................... 425/562; 425/563
[58] Field of Search .................................. 425/562, 563

[56] References Cited

U.S. PATENT DOCUMENTS

| | | |
|---|---|---|
| 2,940,123 | 6/1960 | Beck et al. |
| 4,077,756 | 3/1978 | Meadors. |
| 4,340,353 | 7/1982 | Mayer. |
| 4,427,361 | 1/1984 | Saito. |
| 4,512,733 | 4/1985 | Eichlseder et al. |
| 4,643,665 | 2/1987 | Zeiger ................................ 425/563 |
| 4,681,528 | 7/1987 | Maruyama. |
| 4,850,851 | 7/1989 | Dinerman ........................... 425/562 |
| 5,164,207 | 11/1992 | Durina. |

FOREIGN PATENT DOCUMENTS

| | | |
|---|---|---|
| 73933 | 4/1984 | Japan .................................. 425/563 |

*Primary Examiner*—Tim Heitbrink
*Attorney, Agent, or Firm*—Michael Sand Co.

[57] ABSTRACT

An improved check valve assembly which is mounted on the front end of a feedscrew of an injection molding machine has a check ring which is slidably mounted on the shank of a retainer within the heated barrel of the molding machine. An annular-shaped flow gap is formed between the inner periphery of the check ring and retainer shank for feeding sleeves of heated material into a discharge chamber at the forward end of the barrel. The check ring is movable between a forward material feed position where it is engaged with a front valve seat and a rearward material blocking position where it is engaged with a rear valve seat. A compression coil spring is telescopically mounted on the retainer shank and is located within the annular-shaped flow gap and biases the check ring toward the material block position to provide a positive valve shut-off irrespective of the viscosity of the heated material. In an alternate embodiment, a plurality of circumferentially spaced coil springs extend between opposed annular end surfaces of the check ring and the front valve seat for biasing the check ring toward the material block position.

13 Claims, 3 Drawing Sheets

SPRING BIASED CHECK VALVE FOR AN INJECTION MOLDING MACHINE

BACKGROUND OF THE INVENTION

1. Technical Field

The invention relates to injection molding machines and in particular to a check valve assembly which controls the flow of heated plastic material into a mold cavity. More specifically, the invention relates to an improved check valve assembly which has a spring located within the flow path of the material for biasing the check valve ring toward a material block position to provide a positive valve shut-off for the material flow irrespective of the viscosity of the heated material.

2. Background Information

Injection molding machines of the type in which the invention pertains generally comprise an elongated feedscrew which rotates and reciprocates axially in the cylindrical bore of an elongated heated barrel for moving heated plastic material from an inlet end to the outlet end where it is injected from a distribution chamber through a nozzle and into a mold cavity. The flow of the heated plastic into the distribution chamber for subsequent discharge through the nozzle is controlled by a check valve assembly which includes a movable check ring for regulating the flow of heated material past a front seat and into the distribution chamber.

The check ring moves rearwardly into sealing engagement with a rear seat portion of the check valve assembly in response to back pressure created by the plastic trapped in a filled distribution chamber during the injection molding cycle. When the back pressure is released upon filling of the mold cavity, the incoming plastic moves the check ring away from the rear valve seat allowing for the continued flow of the melted plastic material through the check valve assembly and into the distribution chamber for subsequent discharge through the nozzle and into the mold cavity during the next injection cycle. The heated material is in the form of a cylindrical sleeve as it moves through an annular flow gap formed by the internal periphery of the check ring.

A common problem with such types of check valve assemblies having the movable check ring, is that the viscosity of the plastic material will affect the amount of back pressure created for moving the check ring rearwardly to the material shut-off position. If the check ring is not fully seated in the proper time sequence, additional plastic material may flow past the valve seat affecting the volume of material, and correspondingly affecting the operation of the molding machine and possibly affecting the molded product produced thereby. Thus, it is desirable to provide a positive force for moving the check ring to the material blocking position, which force is independent of the back pressure created by the plastic trapped in the filled distribution chamber, and unaffected by the viscosity of the material.

Examples of prior art injection molding machines utilizing internal springs for various operations of the machine are shown in the following patents.

U.S. Pat. No. 2,940,123 shows an injection molding machine which uses a spring loaded slide valve mounted internally of a needle valve wherein the spring moves the needle valve forward within its channel to close the flow of material through the nozzle orifice overcoming the back pressure exerted by the heated plastic material.

U.S. Pat. No. 3,001,234 discloses the use of a spring in a check shuttle valve which performs a completely different operation than the check valve of the present invention.

U.S. Pat. No. 4,077,756 discloses the use of a spring in the shut-off valve of the mold per se, and not in the check valve assembly of an injection molding machine.

U.S. Pat. No. 4,340,353 discloses the use of a coil spring for the hot sprue valve assembly of an injection molding machine and not in the internal flow control check valve assembly thereof as that of the present invention.

U.S. Pat. No. 4,427,361 shows the use of a coil spring for biasing a mold shut-off pin located within the material distribution chamber and not in the heated material flow path of the check valve assembly of an injection molding machine as in the present invention.

U.S. Pat. No. 4,512,733 discloses the use of a spring mounted within a recess formed in the shank of a valve member for urging the body of the valve member toward a closed position.

U.S. Pat. No. 4,681,528 shows another injection molding machine in which a coil spring is mounted within the material distribution chamber for biasing the closure spool away from the outlet orifice thereof.

U.S. Pat. No. 5,164,204 discloses another shut-off valve for an injection molding machine which utilizes a spring mounted on the shaft of the poppet, out of contact with the molten plastic, for urging the poppet toward the valve body to maintain the valve in a normal closed position.

Although prior art injection molding machines, examples of which are set forth in the above identified patents, utilize springs in their operation, no known prior art machine uses a spring which is located within the flow path of the molten material for biasing the check ring toward the closed position to provide a positive closing action thereon, thereby providing a positive constant closing force on the check ring which move the check ring to the closed position irrespective of the amount of back pressure created thereon, which pressure is affected by the viscosity of the molten material being used in the injection molded machine.

SUMMARY OF THE INVENTION

Objectives of the invention include providing an improved check valve assembly for injection molding machines which utilizes a compression coil spring located within the annular flow path of the molten material to provide a constant biasing force to move the check ring toward the material blocking or shut-off position, thereby rendering the closing movement of the valve unaffected by the amount of back pressure created by the molten material, which heretofore was dependent partially on the viscosity of the particular molten material being used in the injection molding machine.

A still further objective of the invention is providing such a check valve assembly which maintains a constant volume of material being dispensed at each injection cycle by avoiding excess material moving into the distribution chamber past the check ring when in the shut-off position.

A further objective of the invention is to provide such a check valve assembly in which the check ring is interlocked with the front valve seat so as to be axially slidable therewith but which interlocks so that the check ring rotates with the front valve seat to reduce front surface wear on the valve seat.

Another objective is to provide such a valve assembly in which the front and rear valve seats are replaceable components and are slidably mounted on the shank of a retainer with the check ring being slidably captured therebetween, enabling the individual component parts to be replaced if they become worn without requiring replacement of the entire assembly, and in which different front seat components of existing valve assemblies can be utilized without affecting the positive shut-off characteristic of the check valve assembly.

These objectives and advantages are obtained by the improved check valve assembly of the invention, the general nature of which may be stated as including a valve assembly for mounting in an injection molding machine having a heated cylindrical barrel containing a rotating and reciprocating feedscrew therein for feeding heated thermoplastic material therethrough past the check valve assembly toward a discharge chamber at a forward end of the barrel, said check valve assembly including: front and rear valve seats and a check ring slidably mounted therebetween and forming a material flow gap along an inner periphery of the check ring for feeding a sleeve of material therethrough; and spring means mounted within the material flow gap for biasing the check ring toward a closed position and into engagement with the rear valve seat.

BRIEF DESCRIPTION OF THE DRAWINGS

The preferred embodiments of the invention, illustrative of the best modes in which applicant has contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENT

Figure 1:
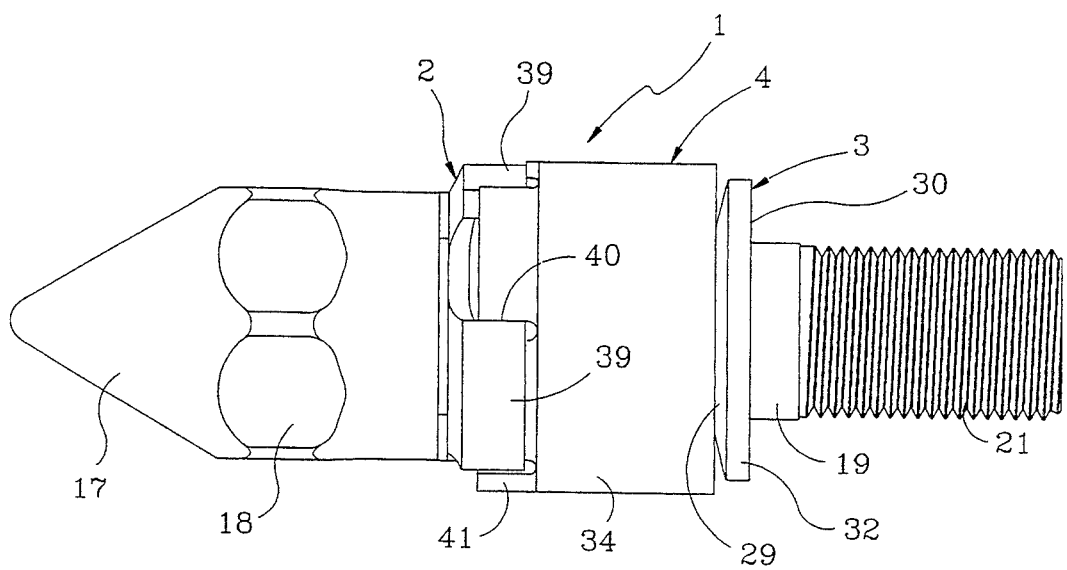
FIG. 1 is an elevational view of the improved check valve assembly with the check ring being shown in its forward position.
Figure 2:
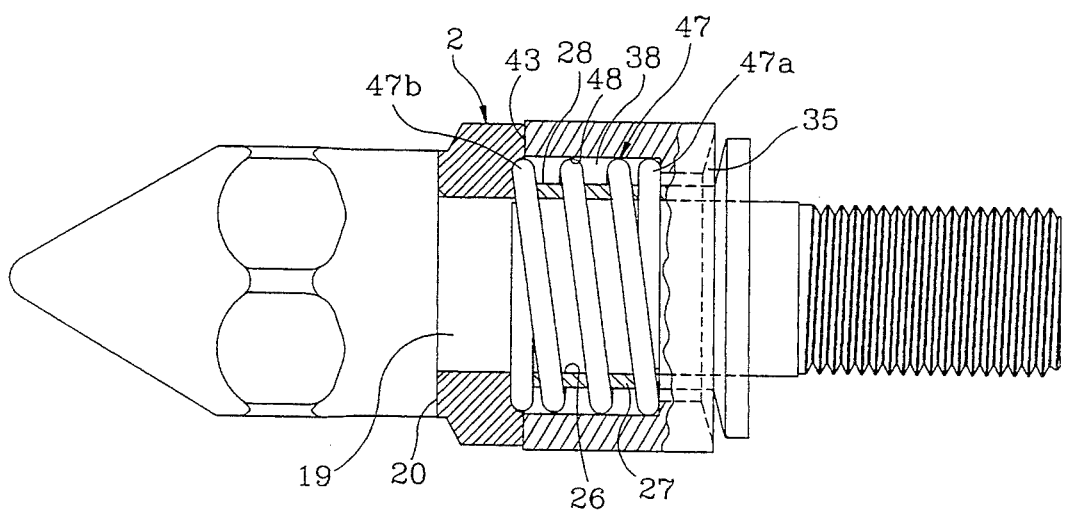
FIG. 2 is a side elevational view similar to FIG. 1, with portions of the check ring broken away and in section.
Figure 3:
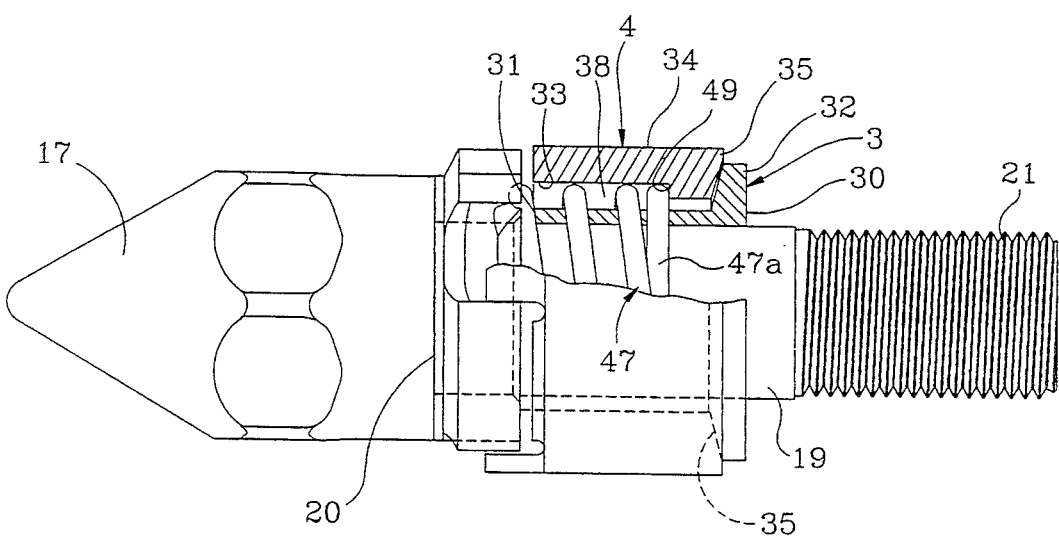
FIG. 3 is a view similar to FIG. 2 with portions of the check ring shown broken away and in section, and in the rearward material shut-off position.

The improved check valve assembly is indicated generally at 1, and is shown particularly in FIGS. 1–3. Valve assembly 1 is shown in the drawings and described throughout as being a four-piece valve assembly consisting of front valve seat 2, a rear valve seat 3, a check ring 4 and a retainer 5. However, the invention need not be limited to a valve assembly having the four individual separate replaceable components as described below and shown in the drawings, but can be incorporated into a valve assembly in which certain of the parts are formed as single unitary members or could include additional components.

Figure 4:
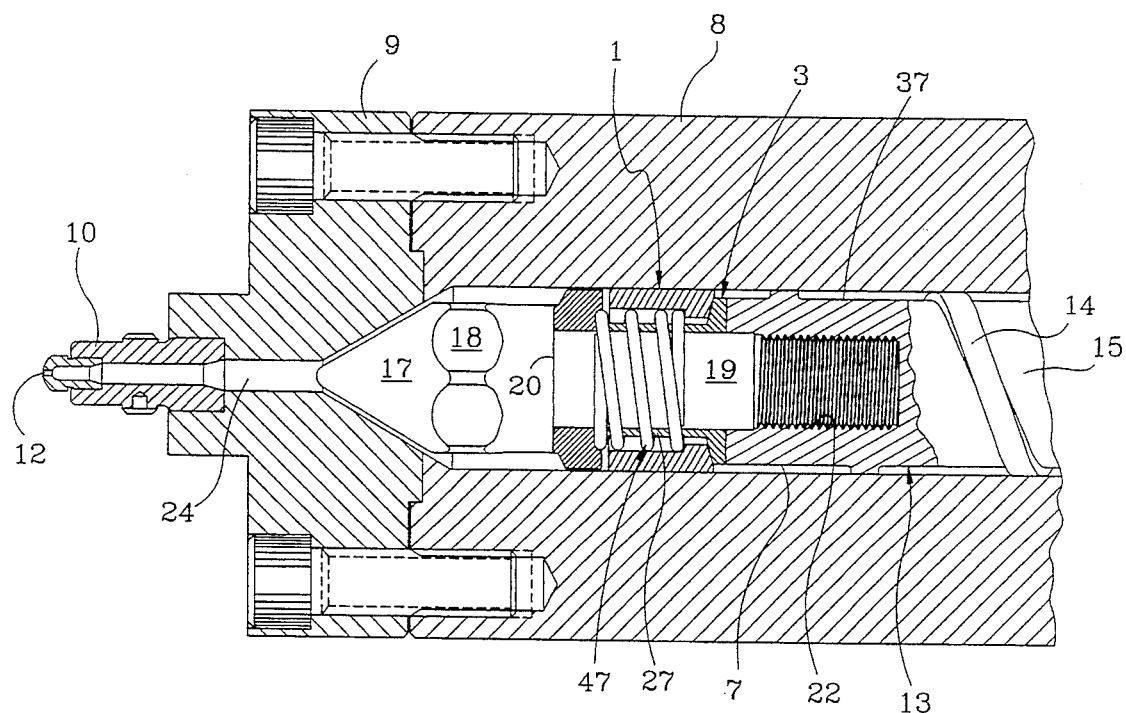
FIG. 4 is a view of the improved valve assembly mounted within the barrel of an injection molding machine with the check ring being shown in the retracted material shut-off position.
Figure 5:
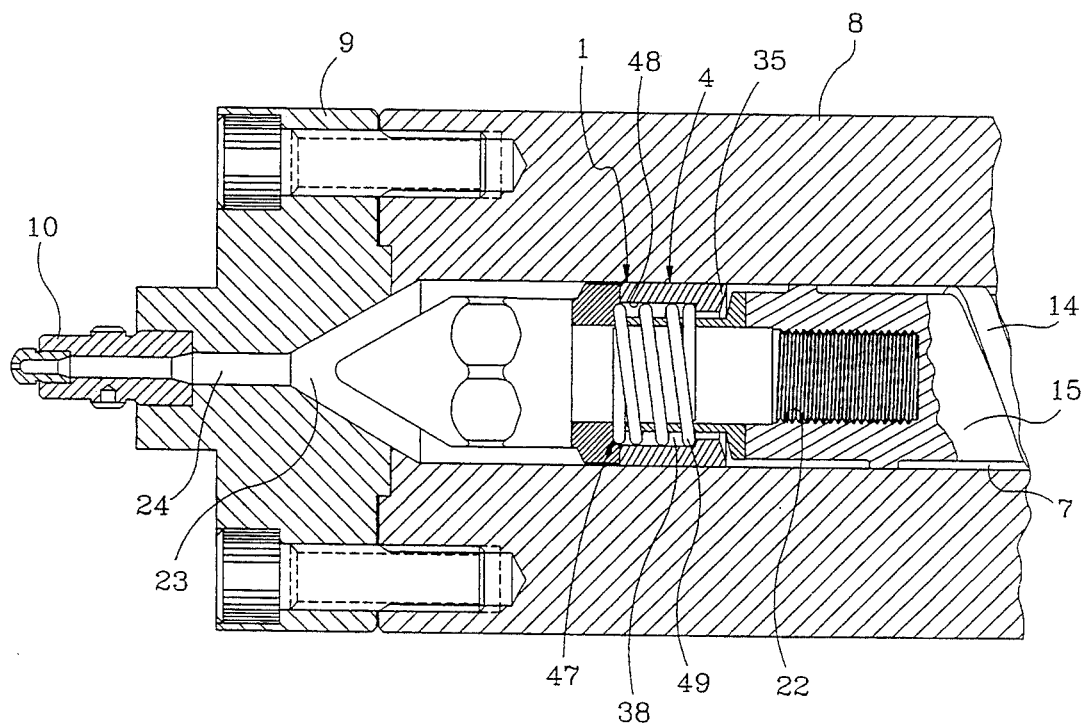
FIG. 5 is a sectional view similar to FIG. 4 with the check ring being shown in its forward open position.
Figure 6:
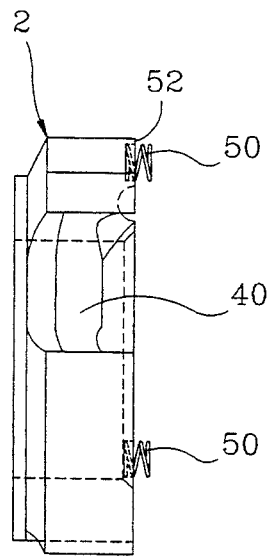
FIG. 6 is a side elevational view of the front valve seat of a second embodiment.
Figure 7:
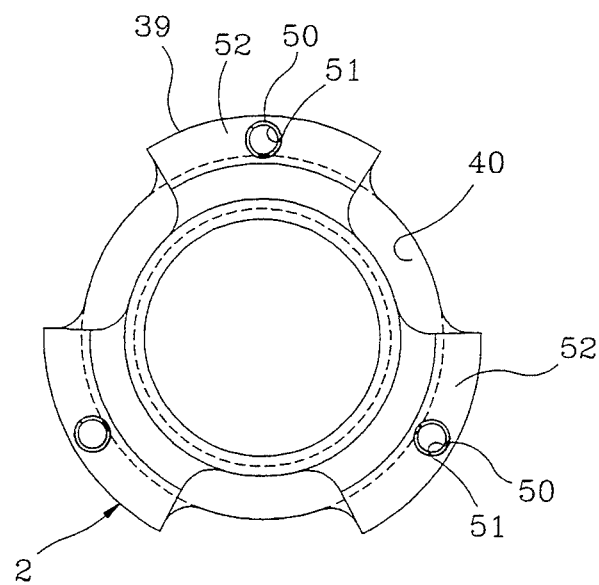
FIG. 7 is a right-hand view of the modified front valve seat shown in FIG. 6.

Check valve assembly 1 is shown in FIGS. 4 and 5 mounted within a cylindrical bore 7 of a barrel 8 of a usual injection molding machine which has a end cap 9 mounted on the forward end of barrel 8 on which a nozzle 10 is secured by a threaded connection or other attachment means. Nozzle 10 is formed with an orifice 12 through which the heated plastic material flows for injection into a usual mold cavity (not shown).

Valve assembly 1 is mounted on the forward end of a usual feedscrew which is indicated generally at 13, which has a helical screw thread 14 separated by valleys 15. Feedscrew 13 is mounted within barrel bore 7 for reciprocating axial movement in addition to rotational movement, which is common in many types of injection molding machines, and which forms no particular part of the present invention.

Retainer 5 is a one-piece member which includes a tapered front end 17 (FIGS. 1–3) which terminates in a plurality of flats 18 adapted for engagement by a wrench for mounting the retainer and remaining valve components on the front end of feedscrew 13. Retainer 5 further includes a cylindrical shank 19 which has a reduced diameter with respect to the front portion of the retainer and forms an annular radially extending shoulder 20 at the junction between shank 19 and the area containing flats 18. The extended end of shank 19 terminates in a threaded rear portion 21 which is threadably engaged within a threaded opening 22 formed in the outer end of feedscrew 13 (FIG. 4). The particular configuration of tapered retainer end 17 will vary according to the particular configuration of a material distribution chamber 23 formed within end cap 9 in which front end 17 is located at the foreword end of its injection stroke, as shown in FIG. 4. The heated material within chamber 23 is fed through an axially extending opening 24 formed in end cap 9 and nozzle 10 for subsequent ejection through nozzle orifice 12.

Rear valve seat 3 includes a cylindrical hub 27 having an internal bore 26 complementary to the diameter of retainer shank 19 so as to provide a sliding engagement therewith. The outer surface 28 of hub 27 has a smooth cylindrical configuration. Hub 27 terminates at one end in a radially outwardly extending collar 32 which has a conical sealing face 29 and a flat annular end face 30. The forward end of hub 27 terminates in an annular edge 31.

Check ring 4 has a generally annular configuration and includes a cylindrical bore 33 and an outer cylindrical surface 34, with the rearward end having an inwardly tapered conical sealing surface 35 for sealing engagement with conical surface 29 of rear valve seat 3. The front or forward end of check ring 4 has a plurality of circumferentially spaced projections 41 (FIG. 1)

which extend into gaps or spaces 40 formed between a plurality of circumferentially spaced projections 39 formed on front valve seat 2. This relationship enables check ring 4 to be axially slidably engageable with front valve seat 2, and rotatably coupled therewith when in the forward open position as shown in FIGS. 1 and 2. This reduces wear on the rear surface of seat 2 and on the front surface of check ring 4 by the heretofore continual rotational rubbing therebetween. Outer cylindrical surface 34 of check ring 4 is slidably guided by inner surface 37 of barrel 8 which forms cylindrical bore 7 as shown in FIGS. 4 and 5. Outer cylindrical surface 28 of rear seat hub 27, together with the interior surface of check ring bore 33, form an annular flow gap 38 which provides for the flow of a generally cylindrical-shaped sleeve of heated plastic material therethrough.

In accordance with the main feature of the invention, a compression coil spring 47 is located within annular flow gap 38 and is located within an annular recess 48 formed in the inner cylindrical surface of the check ring 20 which terminates in an annular rear shoulder 49. The rearmost convolution 47a of coil spring 47 abuts against shoulder 49 and the foreword most convolution 47b abuts against front valve seat 2. Spring 47 biases check ring 4 in a rearward direction away from front valve seat 2 and into engagement with rear valve seat 3 so that conical sealing surfaces 29 and 35 are in closed mating engagement to block the further flow of plastic material therethrough when the valve is in the closed position as shown in FIG. 4.

Heretofore this rearward movement of check ring 4 was caused by the back pressure created by the plastic material when feedscrew 13 was in its forwardmost position as shown in FIG. 4. However, it has been found that the check ring will occasionally bind up and not fully seat permitting the further introduction of material through the flow channel and into the material distribution chamber 23. Likewise, if a very low viscosity material is being injected, it may not create a sufficient back pressure on check ring 4 to move it into a fully seated closed position with rear valve seat 3. Spring 47 thus provides for a positive mechanical action which ensures that check ring 4 is fully seated against rear valve seat 3 to block the further flow of plastic material through flow gap 38 until the feedscrew has returned to its load position as shown in FIG. 5. Projections 39 which are spaced circumferentially about front valve seat 2 form a plurality of circumferentially spaced openings or spaces 40 referred to as flutes through which the plastic material flows when moving into distribution chamber 23. The particular construction of front valve seat 2 may be of the type shown in U.S. Pat. No. 4,643,665, the contents of which are incorporated herein by reference.

The inner diameter of spring 47 will be greater than the outer diameter of hub 27 to permit the flow of plastic material through annular gap 38 so that spring 47 does not form a material blockage in the flow gap. The biasing force of spring 47 likewise is determined to ensure that the incoming flow of plastic material for the next injection cycle has sufficient pressure to overcome the biasing force of spring 47 to enable check ring 4 to move from its closed position of FIG. 4 to the open position of FIG. 5.

The operating sequence of the various components of check valve assembly 1 are those of a usual injection molding machine such as described in the above referenced U.S. Pat. No. 4,643,665 and is thus unaffected by spring 47. However, spring 47 ensures that check ring 4 is in its rearward closed position during the injection mode.

A modified form of the invention is shown in FIGS. 6–9, in which coil spring 47 is replaced with a plurality of circumferentially spaced compression springs 50, which are mounted in holes 51 formed in the front planar surface 52 of projections 39. Preferably, a compression spring 50 is mounted in each of the arcuate surfaces 52, three of which are shown in the particular embodiment of FIGS. 6 and 7.

Figure 8:
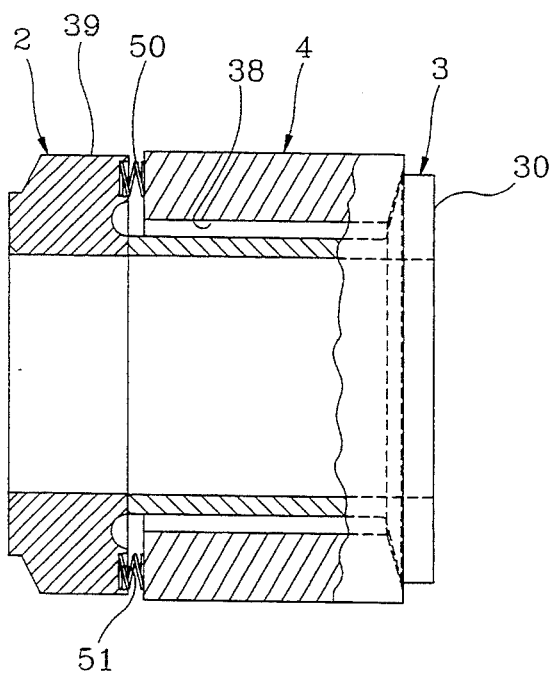
FIG. 8 is a fragmentary sectional view of a portion of FIG. 3, with the modified front valve seat of FIGS. 6 and 7 being shown therein.
Figure 9:
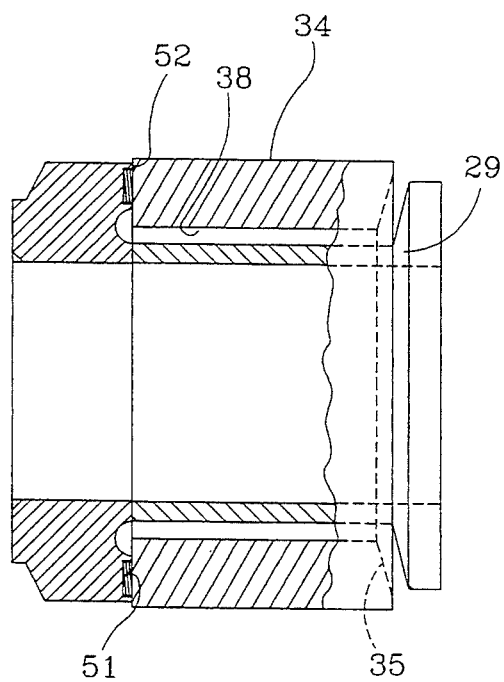
FIG. 9 is a fragmentary sectional view of a portion of FIG. 2 showing the modified front valve seat of FIGS. 6 and 7 moving the check ring to the material flow position.

As shown in FIGS. 8 and 9, front ends of springs 50 will abut against check ring 4 and will exert a biasing force on the check ring, forcing it to its closed position, as shown in FIG. 8, in a similar manner as does coil spring 47, as shown in FIG. 3.

Although the majority of the molten plastic material will flow through openings 40, some of the material will flow past arcuate surfaces 52 and coil springs 50 when moving between annular flow gap 38 and into distribution chamber 23.

Accordingly, the improved spring biased check valve is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved spring biased check valve is constructed and used, the characteristics of the construction, and the advantageous, new and useful results obtained; the new and useful structures, devices, elements, arrangements, parts and combinations, are set forth in the appended claims.

I claim:

1. A check valve assembly for mounting in an injection molding machine having a heated cylindrical barrel containing a rotating and reciprocating feedscrew therein for feeding heated thermoplastic material therethrough past the check valve assembly toward a discharge chamber at a forward end of the barrel, said check valve assembly including:

front and rear valve seats and a check ring slidably mounted therebetween and forming a material flow area along an inner periphery of the check ring and through the front valve seat for feeding material therethrough, the front valve seat including a plurality of spaced projections forming portions of the material flow area therebetween, and a plurality of spaced projections being formed on the check ring and slidably received between corresponding front valve seat projections whereby said front valve seat and said check ring rotate in unison when the check ring is in an open position; and spring means mounted within the material flow area for biasing the check ring toward a closed position and into engagement with the rear valve seat.

2. The valve assembly defined in claim 1 in which the flow area includes an annular flow gap; and in which the spring means includes a compression coil spring mounted within said annular flow gap.

3. The valve assembly defined in claim 1 in which the check ring is formed with a conical end surface which is complementary to a sealing surface of the rear valve seat.

4. The valve assembly defined in claim 1 in which the rear valve seat has a hollow cylindrical-shaped hub terminating at one end in a collar which forms a sealing engagement with a rear sealing face on the check ring; in which said hub is telescopically mounted on a shank of a retainer that is adapted to be connected to a forward end of the feedscrew; and in which the flow area includes a flow gap formed between the interior of the check ring and said hub.

5. The valve assembly defined in claim 4 in which the collar has a conical surface which is complementary to the rear sealing face of the check ring.

6. The valve assembly defined in claim 4 in which the retainer has a tapered front nose and a radially extending rear shoulder at a junction with the shank; and in which the front valve seat has a ring-like configuration with an annular end face which abuts against the retainer rear shoulder.

7. The valve assembly defined in claim 4 in which the spring means is a coil spring; and in which a forwardmost convolution thereof abuts against the front valve seat.

8. The valve assembly defined in claim 4 in which the spring means is a compression coil spring; and in which said coil spring is telescopically mounted about the shank of the retainer.

9. The valve assembly defined in claim 1 in which the spring means includes a plurality of circumferentially spaced coil springs positioned between the front valve seat and the check ring.

10. The valve assembly defined in claim 9 in which the front valve seat is formed with an arcuate end face; in which a plurality of holes are formed in said end face; in which first ends of the coil springs are mounted in said holes; and in which second ends of the coil springs are in abutting engagement with the check ring to bias said check ring toward the closed position.

11. The valve assembly defined in claim 2 in which the check ring is formed with an annular recess and an annular shoulder which defines a boundary of the recess; and in which the coil spring is received within the recess and is in engagement with the annular shoulder.

12. A check valve assembly for mounting in an injection molding machine having a heated cylindrical barrel containing a rotating and reciprocating feedscrew therein for feeding heated thermoplastic material therethrough past the check valve assembly toward a discharge chamber at a forward end of the barrel, said check valve assembly including:

front and rear valve seats and a check ring slidably mounted therebetween and forming a material flow area along an inner periphery of the check ring and through the front valve seat for feeding material therethrough, said front valve seat being formed with an arcuate end face; and spring means mounted within the material flow area for biasing the check ring toward a closed position and into engagement with the rear valve seat, said spring means including a plurality of circumferentially spaced coil springs having first and second ends positioned between the front valve seat and the check ring, said first ends of the coil springs being in abutting engagement with the front valve seat and the second ends of the coil springs being in abutting engagement with the check ring to bias said check ring toward the closed position.

13. The valve assembly defined in claim 12 in which a plurality of holes are formed in the arcuate end face of the front valve seat; and in which the first ends of the coil spring are mounted in said holes.

* * * * *